United States Patent
Hanson et al.

(10) Patent No.: US 6,975,805 B2
(45) Date of Patent: Dec. 13, 2005

(54) LIGHT CHANNEL COMMUNICATION SYSTEM

(75) Inventors: Donald S Hanson, Dearborn, MI (US); Harvinder Singh, Shelby Township, MI (US); Richard K. McMillan, Dearborn, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 84 days.

(21) Appl. No.: 10/219,876

(22) Filed: Aug. 15, 2002

(65) Prior Publication Data
US 2004/0033048 A1 Feb. 19, 2004

(51) Int. Cl.$^7$ ................................. G02B 6/10
(52) U.S. Cl. .............................. 385/146; 385/31
(58) Field of Search .................. 385/146, 39; 362/511

(56) References Cited

U.S. PATENT DOCUMENTS

| | | | |
|---|---|---|---|
| 3,910,105 A | 10/1975 | Hoffstedt | |
| 4,888,076 A | 12/1989 | Martin | |
| 5,317,657 A | 5/1994 | Gallo et al. | |
| 5,477,432 A | 12/1995 | Magic et al. | |
| 5,590,945 A | 1/1997 | Simms | |
| 5,696,865 A * | 12/1997 | Beeson et al. | 385/146 |
| 5,730,519 A * | 3/1998 | Okuchi et al. | 362/559 |
| 5,791,756 A * | 8/1998 | Hulse et al. | 362/554 |
| 5,812,714 A * | 9/1998 | Hulse | 385/39 |
| 5,896,229 A | 4/1999 | Rudisill et al. | |
| 5,905,826 A * | 5/1999 | Benson et al. | 385/31 |
| 5,932,149 A | 8/1999 | Schneider | |
| 5,982,550 A * | 11/1999 | Wright et al. | 359/618 |
| 6,168,302 B1 * | 1/2001 | Hulse | 362/511 |
| 6,174,470 B1 | 1/2001 | Plymale et al. | |
| 6,217,201 B1 * | 4/2001 | Hulse | 362/511 |
| 2002/0167820 A1 | 11/2002 | Haering et al. | |

FOREIGN PATENT DOCUMENTS

| | | |
|---|---|---|
| DE | 297 16 013 U1 | 10/1997 |
| GB | 2 074 313 A | 10/1991 |
| JP | 2000-292274 A | 10/2000 |
| JP | 2001-15012 A | 6/2001 |
| JP | 2001-213158 A | 8/2001 |
| JP | 2002-307994 A | 10/2002 |

\* cited by examiner

*Primary Examiner*—Joseph Williams
*Assistant Examiner*—Dalei Dong
(74) *Attorney, Agent, or Firm*—Brinks Hofer Gilson & Lione

(57) ABSTRACT

The present invention involves a light channel communication component for a vehicle interior member. The light channel communication component comprises an integral polymeric body being a signal-conductive integral medium for transmitting light signals therethrough. The integral polymeric body has a predetermined index of refraction through which the light signals are transmitted. The integral polymeric body further includes a structure of the vehicle interior member to support a shape of the vehicle interior member.

10 Claims, 3 Drawing Sheets

LIGHT CHANNEL COMMUNICATION SYSTEM

BACKGROUND OF THE INVENTION

The present invention relates to a light channel communication system and component for a vehicle interior member.

Electronic data signal transfer is common and has been practiced for many years in various industries. For example, in the automotive industry, vehicle compartments include a multitude of electronic devices which transmit and receive data signals. Such devices may communicate by electrical wires or fiber optics.

Current means for transmitting and receiving information are adequate, but such means may be improved, especially within a vehicle. In many situations, electrical wires or fiber optics are configured to extend relatively far distances, e.g., tens or hundreds of feet, to electrically connect electronic devices. Thus, high quality conductive material is typically required to provide substantial transmission of data or electrical signals from one device to another. Otherwise, loss may be substantial and data may affect transmission quality. In the automotive industry, a typical distance between electrical devices where wires or fiber optics are required may be only a few feet. Thus, a greater degree or proportional amount of data loss may be sustained without noticeably affecting the quality of a data transmission. Moreover, such means include separate wiring and bundling which require space within interior panels of the vehicle. Additionally, the separate bundles of wires and/or fiber optics provide added weight and added cost to the vehicle.

BRIEF SUMMARY OF THE INVENTION

The present invention comprises a light channel communication system and component for a vehicle interior member. The light channel communication component takes on at least part of a shape of a vehicle interior member and serves as a means for transferring data signals between electronic devices and serves as at least part of the structure of the vehicle interior member itself. The present invention provides an integral means of transferring data and signals so that space that otherwise would have been occupied by bundles of electrical wires and/or fiber optics is saved.

In one embodiment, the present invention provides a light channel communication component having an integral polymeric body. The integral polymeric body is a signal-conductive integral medium for transmitting data signals therethrough. The integral polymeric body has a predetermined index of refraction through which the signals are transmitted. The integral polymeric body has a structural framework of the vehicle interior member to support a shape of the vehicle interior member. The light channel communication component allows a transmitter to transmit signals therethrough from a transmitting end and the body, and a receiver to receive the signals at a receiving end.

In another embodiment, the present invention provides a light channel communication component further comprises an integral polymeric body having a channel portion and a support portion formed about the channel portion. The channel portion has a predetermined index of refraction and the support portion has a second index of refraction less than the predetermined index of refraction to allow signals to travel through the channel portion. The channel portion includes an internal body about which the support portion is attached. The internal body is a signal-conductive medium for transmitting light signals therethrough. The internal body further includes an internal transmitting end integral with the internal body from which signals are transmitted. The internal body further includes an internal receiving end integral with the body from which signals are received from the transmitting end. The support portion formed about the channel portion and takes on a structural framework of the vehicle interior member to support a shape of the vehicle interior member.

Further aspects, features and advantages of the invention will become apparent from consideration of the following description and the appended claims when taken in connection with the accompanying drawings.

DETAILED DESCRIPTION OF THE INVENTION

Figure 1:
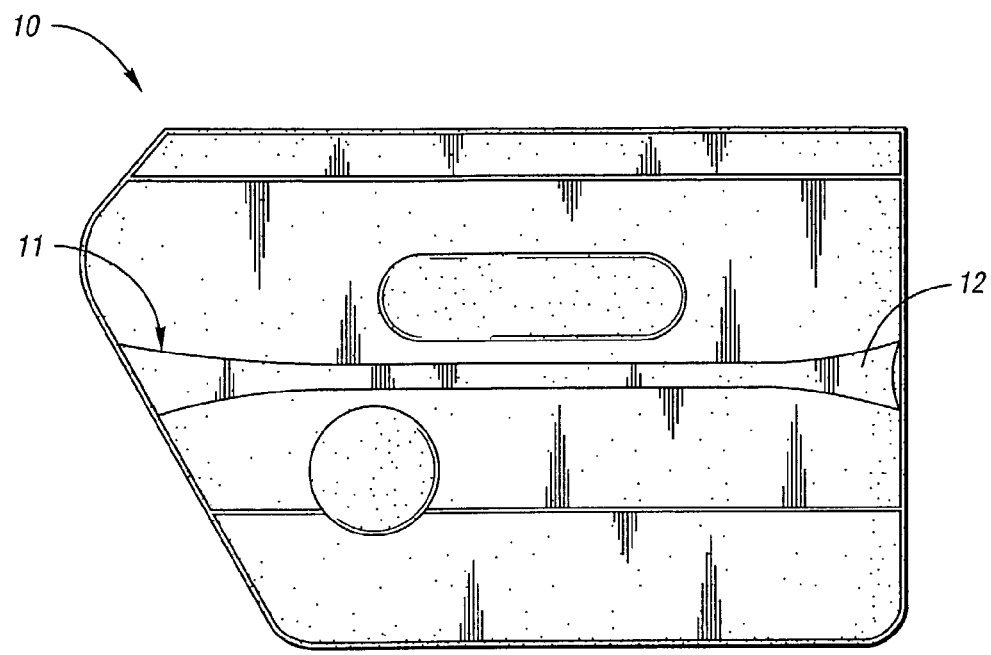
FIG. 1 is an environmental view of a light channel communication system having a light channel communication component for a vehicle interior member in accordance with one embodiment of the present invention.

FIG. 1 illustrates a vehicle interior member 10 having a light channel communication system 11 for a vehicle. The light channel communication system 11 includes a light channel communication component 12 through which light signals or data signals are transferred. In this embodiment, the light channel communication component 12 may take on at least a part of the structure of the vehicle interior member 10. The vehicle interior member 10 may be any part or panel within the vehicle or vehicle interior. For example, the vehicle interior member may include a front panel, a side panel, a headliner, a floor panel, an instrument panel, or any other suitable member within the vehicle.

Figure 2:
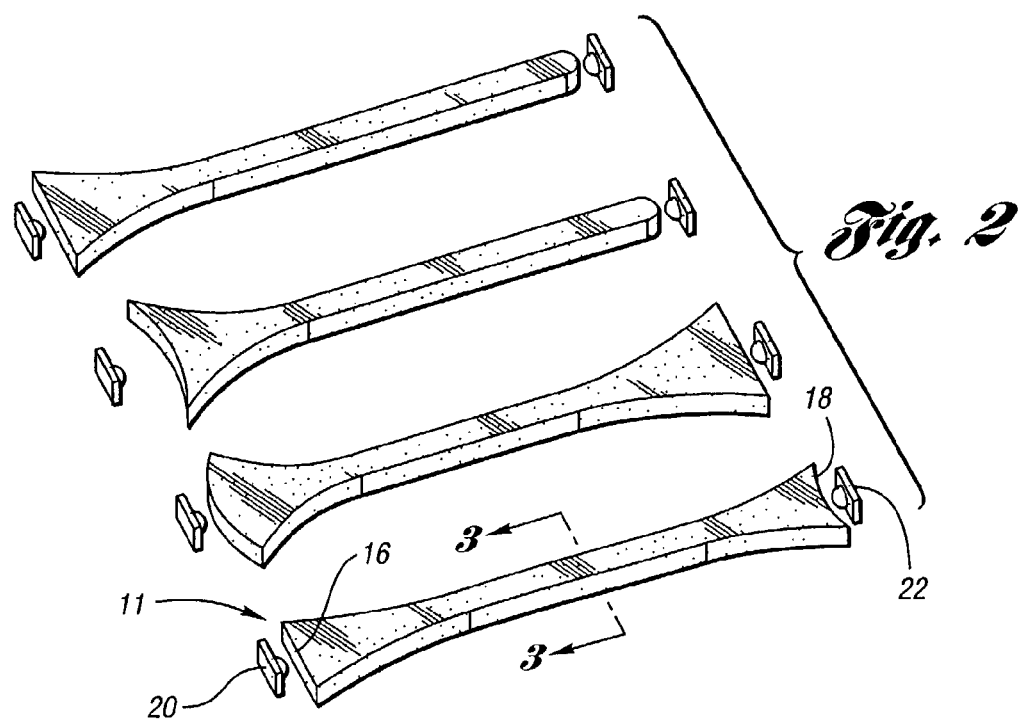
FIG. 2 is a perspective view of the light channel communication component of FIG. 1.
Figure 3:
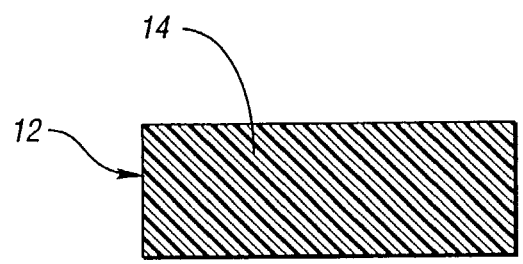
FIG. 3 is a cross-sectional view of the light channel communication component of FIG. 2 taken along lines 3—3.

FIG. 2 illustrates the light channel communication component 12 of the vehicle interior member 10. As shown in FIGS. 2 and 3, the light channel communication component 12 includes an integral polymeric body 14 which is a signal-conductive integral medium for transmitting light signals therethrough. The integral polymeric body 14 has a predetermined index of refraction (discussed below) to allow light signals to be transmitted therethrough and takes on a structural framework of the vehicle interior member 10 to support a shape of the vehicle interior member.

As shown in FIG. 2, the light channel communication component further includes a transmitting end 16 integral with the body 14 from which signals are transmitted and a receiving end 18 integral with the body 14 from which signals are received from the transmitting end 16. The transmitting end 16 is configured to cooperate with a transmitter 20 which transmits signals to the transmitting end 16 and through the integral polymeric body 14 of the light channel communication component. The transmitter 20 is disposed adjacent the transmitting end 16 for producing and encoding light signals through the transmitter end. The signals are transmitted through the receiving end 18 and are received by an optical receiver 22 which is disposed adjacent to the receiving end 18 for receiving and decoding the light signals from the transmitter 20.

The light channel communication component 12 is made of polymeric material having a predetermined index of refraction through which the data or light signals are transmitted. For example, the light channel communication component may be made of polycarbonate, acrylics, polyvinylchloride, and other suitable polymeric materials. The predetermined index may range between 1.3 and 1.7. In this embodiment, the polymeric material of the light channel communication component 12 preferably has an index of refraction of between 1.4 to 1.5.

The transmitter may be any suitable transmitter which may produce and encode light signals through the transmitting end. The optical receiver may be any suitable receiver capable of receiving and decoding the light signals from the transmitter. The signals transmitted may include any light signal or other signals known in the art including infrared signals, near infrared signals, and RF signals.

During normal operation, the transmitter transmits light signals to the transmitting end. Light signals are received at the transmitting end and pass through the body of the light channel communication component. The body maintains a sufficient amount of signals transmitted therethrough which are received by the optical receiver at the receiving end.

In this embodiment, the transmitter end 16 is arcuately shaped to have a convex outer surface. The receiving end 18 is arcuately shaped to have a concave outer surface. However, it is to be understood that the outer surfaces of both the transmitting end and the receiving end may take on any other suitable shape including convex, concave, and planar shapes.

Figure 4:
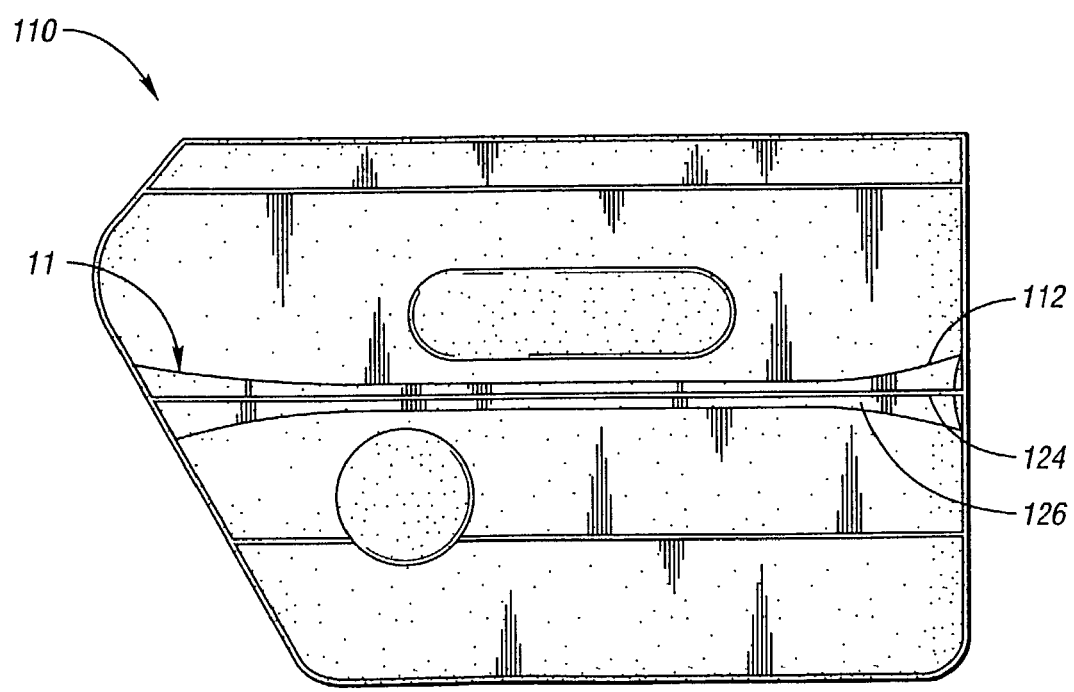
FIG. 4 is an environmental view of another light channel communication system having a light channel communication component for a vehicle interior member in accordance with another embodiment of the present invention.

FIG. 4 illustrates another vehicle interior member 110 having a light channel communication system 111 for a vehicle. The light channel communication system 111 includes a light channel communication component 112 through which light signals or data signals are transferred. As in the first embodiement, the light channel communication component 112 may take on at least a part of the structure of the vehicle interior member 110. The vehicle interior member 10 may be any part or panel within the vehicle or vehicle interior.

Figure 5:
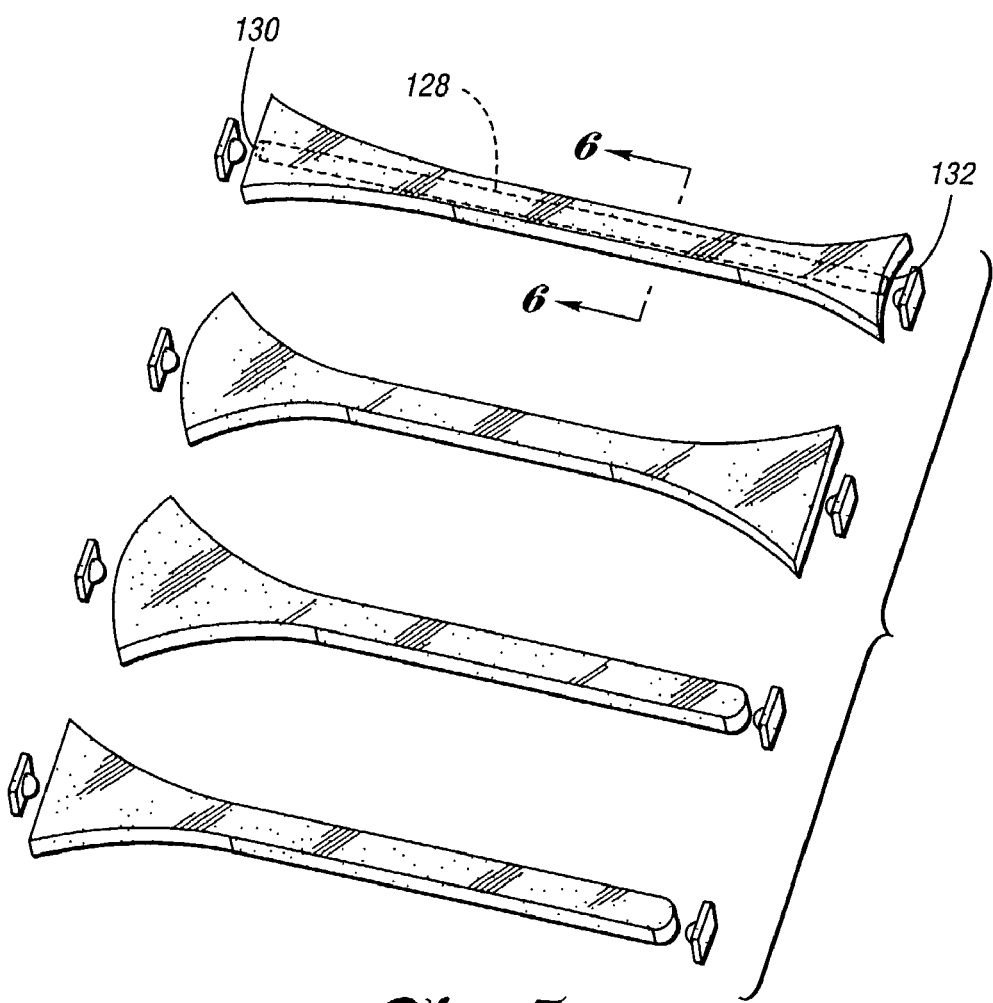
FIG. 5 is a perspective view of another light channel communication component in accordance with another embodiment of the present invention.

FIG. 5 illustrates the light channel component in a perspective view. In this embodiment, a light channel communication system 110 includes similar parts as the light channel communication system 11 discussed above. For example, the light channel communication system 110 includes a light channel communication component 112 having a polymeric body 114, a transmitter 120, a receiver 122 similar to the integral polymeric body 14, the transmitter 20, and the receiver 22, respectively, of the light channel communication system 11.

Figure 6:
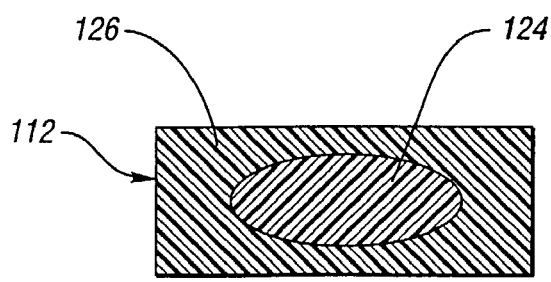
FIG. 6 is a cross-sectional view of the light channel communication component of FIG. 5 taken along lines 6—6.

As shown in FIGS. 5 and 6, the light channel communication component 112 further comprises an integral polymeric body 114 having a channel portion 124 and a support portion 126 formed about the channel portion 124. The channel portion has a predetermined index of refraction which is about 1.3–1.7 and preferably about 1.4–1.5. The support portion 126 has a second index of refraction less than the predetermined index of refraction to allow signals to travel through the channel portion. The second index of refraction is about 1.0–1.5 and preferably 1.3–1.4.

As shown in FIGS. 5 and 6, the channel portion 124 includes an internal body 128 about which the support portion 126 is attached. The internal body 128 is a signal-conductive medium for transmitting light signals therethrough. The internal body 128 further includes an internal transmitting end 130 integral with the internal body 128 from which signals are transmitted. The internal body 128 further includes an internal receiving end 132 integral with the internal body 128 from which signals are received from the transmitting end 130.

The internal transmitting end 130 is configured to cooperate with a transmitter 120 which transmits signals to the transmitting end 130 and through the internal body 128. The transmitter 120 is disposed adjacent the transmitting end 130 for producing and encoding light signals through the transmitter end. The signals are transmitted through the internal receiving end 132 and are received by an optical receiver 122 which is disposed adjacent to the internal receiving end. The optical receiver 122 is disposed adjacent the receiving end 132 for receiving and decoding the light signals from the transmitter.

The support portion 126 provides structural support to the channel portion 124 and takes on at least a part of the shape of a desired vehicle interior member. The channel portion 124 is comprised of polymeric material capable of transferring light signals therethrough having an index of refraction which is greater than the index of refraction of the support portion 126. The support portion 126 also is comprised of a polymeric material. For example, such materials may include polycarbonate, acrylics, polyvinylchloride, and other suitable polymeric material. Of course, other suitable materials may be used without falling beyond the scope or spirit of the present invention.

However, it is to be understood that the polymeric material used to comprise the light channel communication component of the embodiments discussed above may be any suitable polymeric material capable of conducting data or light signals therethrough and allowing a sufficient amount of the light signals to be received at the receiving end.

During normal operation, the transmitter transmits light signals to the internal transmitting end. Light signals are received at the transmitting end and-pass through the internal body of the channel portion. The channel portion, having a greater index of refraction than the support portion, maintains a sufficient amount of signals transmitted therethrough which are received by the optical receiver at the receiving end.

The light channel communication component may be made by any suitable process, such as injection molding, compression molding, or extrusion. The light channel communication component may be made from a polycarbonate or other polymeric material (discussed above) in sheet or film form. The signals used for transmitting may include light signals, IR signals, near IR signals, or any other signals. One method of making the light channel communication component for a vehicle interior member may include extruding an integral polymeric body wherein the polymeric body is a signal-conductive integral medium for transmitting light signals therethrough. The polymeric body, as discussed above, has a structure of the vehicle interior member to support a shape of the vehicle interior member. Then, the method includes cooling the polymeric body to define the light channel communication component.

The present invention provides a light channel communication system and component which allows data signals to be transmitted therethrough over relatively short distances between electronic devices. Data signals which are transmitted through the light channel communication component are sufficiently maintained within the body so that data loss does not affect an overall transmission quality. It has been determined that a relatively greater data loss may be experienced in the present invention, since the transmission of data signals between electronic devices is a relatively substantially short distance within a vehicle. It has also been determined that a relatively high proportional data loss may be experienced in the present invention without substantially affecting signal transmission quality.

As a person skilled in the art will recognize from the previous detailed description and from the figures and claims, modifications and changes can be made to the preferred embodiments of the invention without departing from the scope of this invention defined in the following claims.

What is claimed is:

1. A light channel communication system for a vehicle interior member, the light channel communication system comprising:
    an integral polymeric body being a signal-conductive integral medium for transmitting light signals therethrough, the integral polymeric body including a channel portion and a support portion formed about the channel portion, the channel portion having a predetermined index of refraction through which the light signals are transmitted, the support portion being formed of a structure of the vehicle interior member to support a shape of the vehicle interior member, the channel portion having a first index of refraction and the support portion having a second index of refraction less than the first index of refraction to allow signals to travel through the channel portion;
    a transmitter end integral with the body from which signals are transmitted;
    a receiver end integral with the body from which signals are received from the transmitter end;
    a transmitter disposed adjacent the transmitter end of the body and configured to produce and encode light signals through the transmitter end; and
    an optical receiver disposed adjacent the receiver end and configured to receive and decode the light signals from the transmitter.

2. The light channel communication system of claim 1 wherein the first index of refraction is about 1.3–1.7.

3. The light channel communication system of claim 1 wherein the second index of refraction is about 1.0–1.5.

4. The light channel communication component of claim 1 wherein the transmitter end face is arcuately shaped.

5. The light channel communication component of claim 1 wherein the transmitter end face is substantially planar.

6. The light channel communication component of claim 1 wherein the receiver end face is arcuately shaped.

7. The light channel communication component of claim 1 wherein the receiver end face is substantially planar.

8. The light channel communication component of claim 1 wherein the integral polymeric body is a vehicle interior panel of a vehicle.

9. A vehicle interior member having a light channel communication component, the vehicle interior member comprising:
    an integral polymeric body being a signal-conductive integral medium for transmitting light signals therethrough, the integral polymeric body having a predetermined index of refraction through which the light signals are transmitted and having a structure of the vehicle interior member to support a shape of the vehicle interior member;
    a transmitter end integral with the body from which signals are transmitted;
    a receiver end integral with the body from which signals are received from the transmitter end;
    a transmitter disposed adjacent the transmitter end of the body and configured to produce and encode light signals through the transmitter end; and
    an optical receiver disposed adjacent the receiver end and configured to receive and decode the light signals from the transmitter.

10. A light channel communication system for a vehicle interior member, the light channel communication system comprising:
    an integral polymeric body being a signal-conductive integral medium for transmitting light signals therethrough, the integral polymeric body including a channel portion and a support portion formed about the channel portion, the channel portion having a predetermined index of refraction through which the light signals are transmitted, the support portion being formed of at least part of a panel within the vehicle, the channel portion having a first index of refraction and the support portion having a second index of refraction less than the first index of refraction to allow signals to travel through the channel portion;
    a transmitter end integral with the body from which signals are transmitted;
    a receiver end integral with the body from which signals are received from the transmitter end;
    a transmitter disposed adjacent the transmitter end of the body and configured to produce and encode light signals through the transmitter end; and
    an optical receiver disposed adjacent the receiver end and configured to receive and decode the light signals from the transmitter.

* * * * *